Patented Apr. 1, 1952

2,590,856

UNITED STATES PATENT OFFICE 2,590,856

STABILIZATION OF DILUTE SOLUTIONS OF ALIPHATIC ACIDS

Frank P. Greenspan, Amherst, and Donald G. MacKellar, Kenmore, N. Y., assignors to Buffalo Electro-Chemical Company, Inc., Buffalo, N. Y., a corporation of New York No Drawing. Application May 26, 1949, Serial No. 95,588

5 Claims. (Cl. 260—502)

This invention relates to the stabilization of dilute solutions of aliphatic peracids. It is particularly concerned with the stabilization of dilute solutions of peracetic acid or dilute solutions of its salts, with certain polymeric molecularly dehydrated phosphates, or polyphosphates.

Peracetic acid and its salts are principally used in dilute solution as bleaching, washing and germicidal baths, the concentration of such baths being below about 4% by weight and generally at or below 1% by weight. These baths are frequently used with the pH adjusted to fall within the range of 4 to 9. When such baths are adjusted to pHs approximately 4 or above, the tendency of the peracetic acid toward decomposition becomes pronounced. Further, the decomposition of such peracetic acid baths is accelerated where the bath is operated at an elevated temperature. Ordinarily, these peracetic acid baths are maintained at temperatures of from 25° to 100° C.

It is accordingly one of the principal objects of the present invention to effectively stabilize dilute solutions of aliphatic peracids having a pH of at least about 4.

Another object is to effectively stabilize dilute solutions of aliphatic peracids at elevated temperatures, that is, at temperatures of 25° C. and above.

Another object is to employ a stabilizer which does not interfere in any way with the use of the dilute solution of the aliphatic peracid or deleteriously affect its action.

The invention will be described particularly in connection with peracetic acid, as an example of one of the aliphatic peracids. Peracetic acid, CH₃COOOH, may generally be regarded as derived from acetic acid, CH₃COOH, by replacement of the hydroxyl group OH by the perhydroxyl group OOH. Peracetic acid when present in aqueous solution may, of course, exist in the form of the acid itself, or as the salts of this peracid, depending upon the pH of the particular solution. Since peracetic acid and its salts are, when employed for various oxidizing, germicidal and bleaching purposes, the full equivalents of one another, the improved procedure for stabilizing dilute aqueous solutions of these compounds, while disclosed herein with particular reference to peracetic acid itself, is also equally effective for stabilizing dilute aqueous solutions of its salts.

The stabilization of aqueous solutions of peracetic acid is not merely concerned with arresting or retarding the breakdown into oxygen and acetic acid. Rather, the decomposition of aqueous solutions of peracetic acid or its salts, in common with other organic peracids, involves a relatively complicated series of reactions which yield varying amounts of different decomposition products. Thus, the decomposition appears to proceed principally in accordance with the following three equations:

I. 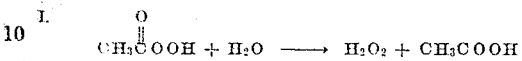

II. 

III. 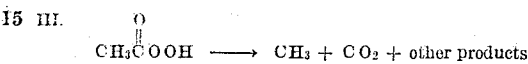

For example, the gas evolved from a quantity of an aqueous solution containing 40% commercial peracetic acid adjusted to pH 6.5 and maintained at room temperature was collected and analyzed with the following results:

| | Per cent |
|---|---|
| $CO_2$ | 24.8 |
| $O_2$ | 74.6 |
| CO | 0 |
| Remainder | 0.6 |

Similarly, the gases evolved from two samples of aqueous solutions containing 1% peracetic acid adjusted to pH 6.5, with one sample maintained at room temperature and the other sample maintained at a temperature of 80° C., were collected and analyzed as follows:

| | Room Temp. | 80° C. |
|---|---|---|
| | Percent | Percent |
| $CO_2$ | 1.6 | 3.2 |
| $O_2$ | 94.0 | 95.8 |
| CO | 0.2 | 0 |
| Remainder | 4.2 | 1.0 |

The three types of reaction given above for the decomposition of peracetic acid are probably not the only ones which can take place, but they are the simplest which adequately explain the formation of the principal decomposition products.

It will therefore be seen that the decomposition products of peracetic acid can be oxygen, acetic acid, hydrogen peroxide, carbon dioxide, carbon monoxide, and other compounds. Further, depending upon the conditions affecting the decomposition, the decomposition in accordance with any one of the above equations may predominate over the other equations and the action of any particular compound as a stabilizer for peracetic acid cannot be predicted. Further, the action of a compound as a stabilizer is profoundly influenced by the concentration, pH and temperature of the peracetic acid solution to be stabilized.

We have found polymeric molecularly dehydrated phosphates to be particularly effective in stabilizing dilute aqueous solutions of peracetic acid, especially where the solutions are maintained at temperatures of 25° to 100° C. The polymeric molecularly dehydrated phosphates or polyphosphates, which may be employed according to the present invention have a molar ratio of $R_2O$ to $P_2O_5$ not greater than 1.7 to 1, where R represents one or more alkali metals, hydrogen, ammonium, or any combination thereof. The polymeric molecularly dehydrated phosphates may be glassy or crystalline. Among the phosphates applicable to this invention are those commonly designated as sodium hexametaphosphate, sodium tetraphosphate, sodium tripolyphosphate, and sodium tetrameta-pyrophosphate as indicated in the following table:

| Common Name | Empirical Formula | $R_2O:P_2O_5$ Ratio |
|---|---|---|
| Sodium hexametaphosphate | $(NaPO_3)_6$ | 1:1 |
| Sodium tetraphosphate | $Na_6P_4O_{13}$ | 1.5:1 |
| Sodium tripolyphosphate | $Na_5P_3O_{10}$ | 1.67:1 |
| Sodium tetrameta-pyrophosphate | $(NaPO_3)_4\cdot Na_4P_2O_7$ | 1.33:1 |

We have found that such polymeric molecularly dehydrated phosphates in concentrations of 100–1000 p. p. m. are effective in stabilizing dilute solutions of peracetic acid adjusted to have a pH of 4 or higher and maintained at low or high temperatures. In actual mill practice, increased polymeric molecularly dehydrated phosphate content may be found advisable because of the nature of the water used and the presence of the goods.

In the following examples 100 ml. samples of the material under investigation were prepared in volumetric flasks and immersed in a water bath at the temperature designated ±0.1° C. At appropriate intervals, 10 ml. samples were removed and analyzed by the standard $KMnO_4$-thiosulfate method for peracetic acid. The pH adjustments were made by adding predetermined amounts of 35% NaOH. Stabilizers were added in the form of solid, commercially available material.

TABLE I

*1% peracetic acid at 30° C. and pH 6.5 (initial)*

| Stabilizer | Percent peracetic acid loss | |
|---|---|---|
| | at 4 hours | at 24 hours |
| | Percent | Percent |
| None | 48 | 80 |
| Sodium hexametaphosphate (250 p. p. m.) | 15 | 42 |
| Sodium hexametaphosphate (1,000 p. p. m.) | 12 | 42 |
| Sodium tetraphosphate (250 p. p. m.) | 17 | 50 |
| Sodium tripolyphosphate (250 p. p. m.) | 14 | 58 |

All of the polymeric molecularly dehydrated phosphates tested above showed a marked stabilizing influence without tendency to cloudiness or unusual bath foaming. It will particularly be noted that after 24 hours the peracid losses in the baths stabilized with sodium hexametaphosphate were approximately one-half those of the unstabilized bath. It will also be noted that no great difference was found between the effects of 250 p. p. m. and 1000 p. p. m. sodium hexametaphosphate as the stabilizer. However, in actual mill practice, increased stabilizer content may be found necessary because of the nature of the water used and presence of the goods.

Experiments were also made to determine the stabilizing effect of these phosphates with 0.1% peracetic acid baths, the results being as follows:

TABLE II

*0.1% peracetic acid at 30° C. and pH 6.5 (initial)*

| Stabilizer | Percent peracetic acid loss | |
|---|---|---|
| | at 4 hours | at 24 hours |
| | Percent | Percent |
| None | 4 | 36 |
| Sodium hexametaphosphate (250 p. p. m.) | 2 | 17 |
| Sodium tetraphosphate (250 p. p. m.) | 2 | 12 |
| Sodium tripolyphosphate (250 p. p. m.) | 0 | 34 |

0.1% peracetic acid is more stable than 1% peracetic acid. It will be noted, however, that even at this concentration the polymeric molecularly dehydrated phosphates exhibit a marked stabilizing action.

Experiments were also made to determine the stabilizing effect of the polymeric molecularly dehydrated phosphates described, at a higher temperature, the results being as follows. Included for comparison purposes are results obtained using sodium pyrophosphate ($R_2O:P_2O_5$ ratio of 2:1)

TABLE III

*0.1% and 0.5% peracetic acid at 80° C. and pH 6.5 (initial)*

| Stabilizer | Per cent peracetic acid loss in 60 minutes | |
|---|---|---|
| | 0.1% peracetic acid | 0.5% peracetic acid |
| | Percent | Percent |
| None | 65 | 82 |
| Sodium hexametaphosphate (250 p. p. m.) | 41 | 54 |
| Sodium tetraphosphate (250 p. p. m.) | 42 | 65 |
| Sodium tripolyphosphate (250 p. p. m.) | 54 | |
| Sodium pyrophosphate (250 p. p. m.) | 73 | 83 |

At 80° C., as expected, the rate of decomposition of peracetic acid is higher than at 30° C. The polymeric molecularly dehydrated phosphates ($R_2O:P_2O_5$ not greater than 1.7:1) show marked stabilizing action, even at this high temperature. In contrast, is the poor performance at 80° C. of sodium pyrophosphate.

The stabilizing action of sodium tetrameta-pyrophosphate as well as sodium hexametaphosphate in 1.0% peracetic acid solution at 30° C. and 80° C. are shown in the following tables:

TABLE IV

*1.0% peracetic acid at room temperature (30° C.) and pH 6.5 (initial)*

| Stabilizer | Percent peracetic acid loss | |
|---|---|---|
| | at ½ hour | at 3 hours |
| | Percent | Percent |
| None | 26 | 39 |
| Sodium tetrameta-pyrophosphate (100 p. p. m.) | 1 | 5 |
| Sodium hexametaphosphate (100 p. p. m.) | 2 | 11 |

TABLE V

*1.0% peracetic acid at 80° C. and pH 6.5 (initial)*

| Stabilizer | Percent peracetic acid loss in 1 hour |
|---|---|
| | Percent |
| Sodium tetrameta-pyrophosphate (100 p. p. m.) | 57 |
| Sodium hexametaphosphate (100 p. p. m.) | 52 |

The applicability of this procedure for stabilizing dilute solutions aliphatic peracids in general can be seen from the following results obtained with perpropionic acid:

TABLE VI

*1% perpropionic acid at 30° C. and pH 7 (initial)*

| Stabilizer | Percent peracid loss | |
|---|---|---|
| | at 1 hour | at 48 hours |
| | Percent | Percent |
| None | 14 | 83 |
| Sodium hexametaphosphate (250 p. p. m.) | 2 | 58 |

TABLE VII

*1.0% perpropionic acid at 80° C. and pH 7 (initial)*

| Stabilizer | Percent peracid loss | |
|---|---|---|
| | at 1 hour | at 48 hours |
| | Percent | Percent |
| None | 89 | 100 |
| Sodium hexametaphosphate (250 p. p. m.) | 71 | |

It will be apparent that changes and modifications can be made which will nevertheless fall within the scope of this invention. Accordingly, it is intended that the invention is not restricted to the various details, conditions, amounts, and procedures given as typical and illustrative of the preferred procedure except as necessitated by the prior art and appended claims.

We claim:

1. The method of stabilizing a bath used for bleaching, washing or germicidal purposes and comprising a dilute aqueous solution of an aliphatic peracid containing not more than about 4% by weight of said peracid and having a temperature of from 25° to 100° C. and having a pH of not less than about 4, said method comprising incorporating in said bath a stabilizing amount about 100 to about 1000 p. p. m. of a polymeric molecularly dehydrated phosphate having a molar ratio of $R_2O$ to $P_2O_5$ not greater than 1.7 to 1 where R represents one or more alkali metals, hydrogen, ammonium, or any combination thereof.

2. The method of stabilizing a bath used for bleaching, washing or germicidal purposes and comprising a dilute aqueous solution of peracetic acid containing not more than about 4% by weight of said acid and having a temperature of from 25° to 100° C. and having a pH of not less than about 4, said method comprising incorporating in said bath a stabilizing amount of a polymeric molecularly dehydrated phosphate having a molar ratio of $R_2O$ to $P_2O_5$ not greater than 1.7 to 1 where R represents one or more alkali metals, hydrogen, ammonium, or any combination thereof.

3. The method of stabilizing a bath used for bleaching, washing or germicidal purposes and comprising a dilute aqueous solution of perpropionic acid containing not more than about 4% by weight of said acid and having a temperature of from 25° to 100° C. and having a pH of not less than about 4, said method comprising incorporating in said bath a stabilizing amount of a polymeric molecularly dehydrated phosphate having a molar ratio of $R_2O$ to $P_2O_5$ not greater than 1.7 to 1 where R represents one or more alkali metals, hydrogen, ammonium, or any combination thereof.

4. The method as set forth in claim 1 wherein said stabilizing amount is in the range of from about 100 to about 1000 p. p. m.

5. The method of improving the stability of a bath made up and used for a few hours for bleaching, washing, or germicidal purposes and which bath comprises a dilute aqueous solution of an aliphatic peracid containing not more than about 4% by weight of said peracid and having a pH of not less than about 4 and having a temperature of from 25° to 100° C., said method comprising incorporating in said bath a stabilizing amount of a polymeric molecularly dehydrated phosphate having a molar ratio of $R_2O$ to $P_2O_5$ not greater than 1.7 to 1 where R represents one or more alkali metals, hydrogen, ammonium, or any combination thereof.

FRANK P. GREENSPAN.
DONALD G. MacKELLAR.

REFERENCES CITED

The following references are of record in the file of this patent:

UNITED STATES PATENTS

| Number | Name | Date |
|---|---|---|
| 2,027,838 | Reichert | Jan. 14, 1936 |
| 2,058,315 | Huttenlocher et al. | Oct. 20, 1936 |
| 2,259,479 | Morgan | Oct. 21, 1941 |
| 2,347,434 | Reichert et al. | Apr. 25, 1944 |

OTHER REFERENCES

Morgan et al., Ind. and Eng. Chem., vol. 35, #7, pp. 821–824.

Bell, Ind. and Eng. Chem., vol. 39, #2, pp. 136–140.

Chemical Process Industries by Shreve, 1945 issue, published by McGraw-Hill, page 340.